United States Patent [19]

Hattori et al.

[11] Patent Number: 4,715,663
[45] Date of Patent: Dec. 29, 1987

[54] BRAKE OIL PRESSURE CONTROL DEVICE

[75] Inventors: Yoshiyuki Hattori, Toyoake; Kazuma Matsui, Toyohashi; Yuichi Imani, Hamamatsu; Akira Kuno, Obu; Tetsuya Nagata, Konan; Koji Nakane, Anjo; Ken Nomura, Okazaki, all of Japan

[73] Assignee: Nippondenso Co., Ltd., Kariya, Japan

[21] Appl. No.: 908,234

[22] Filed: Sep. 17, 1986

Related U.S. Application Data

[63] Continuation-in-part of Ser. No. 792,007, Oct. 28, 1985, Pat. No. 4,627,671, and Ser. No. 793,760, Nov. 1, 1985, Pat. No. 4,687,260.

[30] Foreign Application Priority Data

Sep. 23, 1985 [JP] Japan .................................. 60-210846
May 7, 1986 [JP] Japan .................................. 61-104457

[51] Int. Cl.$^4$ ............................................ B60T 8/86
[52] U.S. Cl. ............................................ 303/110; 303/116
[58] Field of Search ................ 303/10, 61, 93, 96, 303/110, 111, 113, 116, 119; 180/197; 364/426

[56] References Cited

U.S. PATENT DOCUMENTS 4,641,895 2/1987 Belart et al. ...................... 303/119
4,665,490 5/1987 Masaki et al. ................... 303/110 X

FOREIGN PATENT DOCUMENTS

57-22948 2/1982 Japan .
58-16948 1/1983 Japan .

Primary Examiner—Duane A. Reger
Attorney, Agent, or Firm—Cushman, Darby & Cushman

[57] ABSTRACT

A brake oil pressure control device including a main line system for a normal braking operation, and a subline system for antiskid control and acceleration slip control. The main line system connects a master cylinder to a wheel cylinder, and has a first valve which opens the main line for a normal braking operation, and closes the main line when an antiskid control or acceleration slip control is in effect. The subline system has an oil pump connected to the wheel cylinder through a subline having a second valve, which is controlled to open and close the subline for the antiskid control or acceleration slip control. Inlet and outlet ports are connected by a relief pipe having a third valve and a relief valve. The relief valve opens the relief pipe under pressure from the master cylinder when a discharge pressure from the oil pump is higher than the pressure at the master cylinder, to restrain the discharge pressure from the oil pump. The third valve opens the relief pipe for an antiskid control, and closes the relief pipe for an acceleration slip control.

9 Claims, 6 Drawing Figures

BRAKE OIL PRESSURE CONTROL DEVICE

This application is a continuation-in-part of application Ser. No. 792,007 filed Oct. 28, 1985 now U.S. Pat. No. 4,627,671, and application Ser. No. 793,760, filed Nov. 1, 1985 now U.S. Pat. No. 4,687,260.

BACKGROUND OF THE INVENTION

1. Field of the Invention

The present invention relates to a brake oil pressure control device of a vehicle, more particularly, it relates to a brake oil pressure control device which can carry out an antiskid control upon braking and a wheel traction control upon acceleration. The antiskid control prevents the wheels of a vehicle from locking when the brake system of the vehicle is operated, so that drivability of the vehicle is maintained, and the acceleration slip control prevents loss of traction (hereinafter referred to as "slip") by the drive wheels when the vehicle is suddenly accelerated from a stop position, so that the running stability and acceleration ability of the vehicle are improved.

2. Description of the Related Art

Conventional brake oil pressure control devices which can carry out both the above antiskid control and acceleration slip control are disclosed in, for example, Japanese Unexamined Patent Publication Nos. 57-22948 and 58-16948.

In the control device disclosed in the former publication, a first control valve selectively connects wheel cylinders to a main pipe which communicates with a master cylinder, or to a return pipe. A second control valve selectively connects the return pipe to a discharge pipe communicated with a reservoir, or to an auxiliary pipe communicated with a pump. When an antiskid control is effected, the second control valve connects the return pipe to the reservoir, and the first control valve connects the wheel cylinders to the main line or to the return pipe, so that pressure in the wheel cylinders is controlled. When an acceleration slip control is effected, the first control valve connects the wheel cylinders to the return pipe, and the second control valve connects the return pipe to the auxiliary pipe or to the discharge pipe so that pressure in the wheel cylinders is controlled. Namely, the return pipe is used to return brake oil in the wheel cylinders to the reservoir during the antiskid control, and to supply pressurized brake oil from the pump to the wheel cylinders during the acceleration slip control. Therefore, the return pipe is subjected to a high pressure, and thus the construction thereof must be able to withstand such a high pressure. Further, the second control valve must be constructed in such a manner that a perfect seal is effected between ports of the valve and pipes.

In the control device disclosed in the latter publication, an acceleration slip control device includes rotation sensors for sensing wheel rotation, and control valves for controlling brake oil pressure in the drive wheels. This acceleration control device further is provided with an electric control circuit, so that the drive wheels are controlled according to signals from the rotation sensors. The electric control circuit is provided with a signal output means which outputs a signal representing a slip value and a signal proportional to a vehicle velocity. A comparator in the electric control circuit compares the slip value with a threshold value which corresponds to a maximum value of the amount of slip allowed at the drive wheels. If vehicle speed is higher than the threshold value, a signal is output to reduce the drive torque of the engine. In this conventional brake oil pressure control device, a pressure control device must be provided only for acceleration slip control, and therefore, not only is the construction of the brake oil pressure control device complicated but also the size and weight of the device are increased.

SUMMARY OF THE INVENTION

Therefore, an object of the present invention is to provide a brake oil pressure control device in which the construction is simple and the size and weight of the device are reduced.

According to the present invention, there is provided a brake oil pressure control device comprising a main line system, a subline system, a controlling means, a sensing means, and a valve control mechanism. The main line system has a main line connecting a master cylinder to wheel cylinders, and a first valve provided between the master cylinder and the wheel cylinders to open and close the main line. The subline system has a pressure source, a subline connecting the pressure source to the wheel cylinders, and a second valve provided between the pressure source and the wheel cylinders to open and close the subline. The controlling means controls the oil pressure from the pressure source. The controlling means has a relief pipe connecting a discharge port of the pressure source to a reservoir, a relief valve provided in the relief pipe, and a third valve provided in the relief pipe to open and close the relief pipe. The relief valve opens the relief pipe in accordance with the oil pressure at the master cylinder, so that oil pressure from the pressure source is kept lower than the oil pressure at the master cylinder. The sensing means senses both a locking and a slipping condition of the wheels. The valve control mechanism controls the first, second, and third valves in accordance with the locking or slipping condition of the wheels.

BRIEF DESCRIPTION OF THE DRAWINGS

The present invention may be more fully understood from the description of the preferred embodiments of the invention set forth below, together with the accompanying drawing, in which.

FIGS. 3 and 3A, 3B illustrate a flowchart of a program for an antiskid control and an acceleration slip control;

DESCRIPTION OF THE PREFERRED EMBODIMENTS

The present invention will now be described with reference to the following preferred embodiments.

Figure 1:
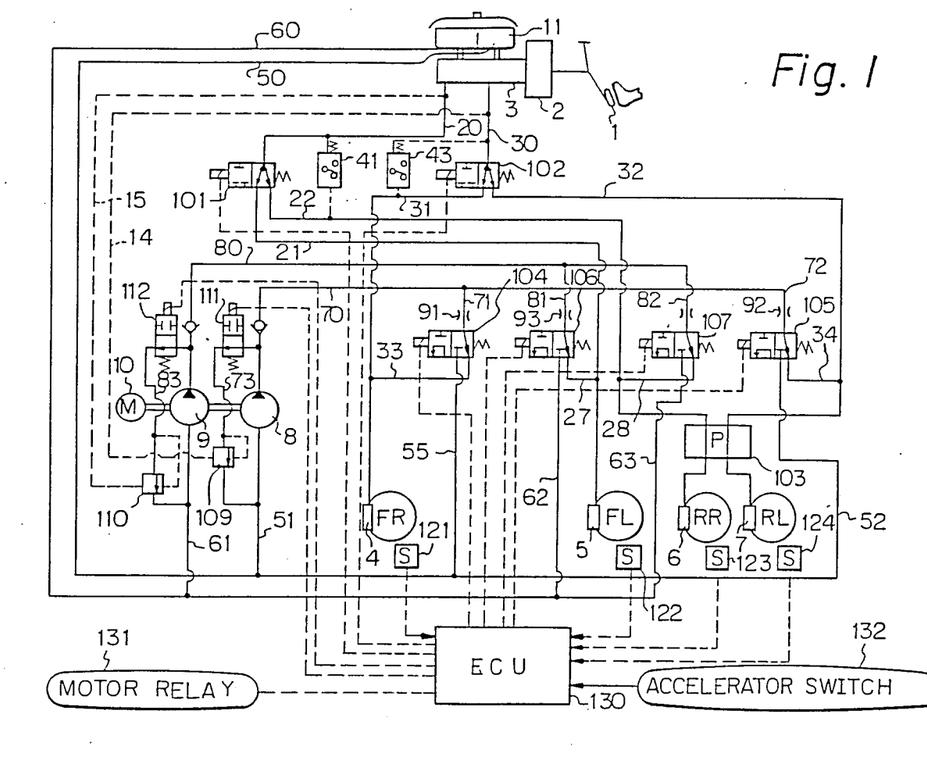
FIG. 1 is a hydraulic circuit of a first embodiment of the present invention.

FIG. 1 shows a first embodiment of the present invention. This embodiment is an example in which the present invention is applied to a so-called FF (front-engine-front-drive) type vehicle provided with a brake system having a well-known X-type piping system. That is, the brake system is constructed in such a manner that a wheel cylinder 4 of the front right (FR) wheel and a wheel cylinder 7 of the rear left (RL) wheel are supplied with brake oil through the same piping system, and a wheel cylinder 5 of the front left (FL) wheel and a wheel cylinder 6 of the rear right (RR) wheel are supplied with brake oil through the same piping system. A brake pedal 1 is connected to a master cylinder 3 through a brake booster 2, so that an oil pressure generated by operation of the brake pedal 1 is transmitted to the wheel cylinders 4, 5, 6, and 7 of the front right (FR), front left (FL), rear right (RR), and rear left (RL) wheels, respectively, to carry out a braking operation. The brake booster 2 is, as previously known, operated by a negative pressure occurring in an intake manifold of the engine, and this pressure is exerted on a push rod connected to a piston of the master cylinder 3 in response to an operation of the brake pedal 1, to reduce the force needed by the driver when operating the brake pedal 1.

The master cylinder 3 is provided with two pressure chambers (not shown) from which brake oil is discharged at the same pressure. The chambers are connected to main lines 20 and 30, respectively. The main line 20 diverges to branch lines 21 and 22; the branch line 21 being connected to the wheel cylinder 5 of the front left (FL) wheel, and the branch line 22 being connected to the wheel cylinder 6 of the rear right (RR) wheel. A first valve 101, which is a three-port-two-position valve, is provided in the divergent portion of the branch lines 21 and 22. The first valve 101 opens the divergent portion so that the upstream portion of the main line 20 communicates with the branch lines 21 and 22, at the first valve position (the normal valve position) shown in the drawing. The first valve 101 closes the divergent portion so that the upstream portion of the main line 20 is cut off from the branch lines 21 and 22, at the second valve position (the offset valve position) not shown in the drawing. The main line 30 diverges to branch lines 31 and 32; the branch line 31 being connected to the wheel cylinder 4 of the front right (FR) wheel, and the branch line 32 being connected to the wheel cylinder 7 of the rear left (RL) wheel. A second valve 102, which is a three-port-two-position valve, is provided in the divergent portion of the branch lines 31 and 32. The second valve 102 opens and closes the branch lines 31 and 32 in the same way as the first valve 101.

A previously known proportioning valve 105 is provided in the branch lines 22 and 32 connected to the wheel cylinders 6 and 7 of the left (RL) and right (RR) rear wheels, respectively, so that brake oil having a pressure lower than the discharge pressure of the master cylinder 3 is supplied to the wheel cylinders 6 and 7 of the left (RL) and right (RR) rear wheels when the oil pressure in the branch lines 22 and 32 is more than a predetermined constant value.

A usual brake operation is carried out by the construction described above. In this state, the first valves 101 and 102, are positioned in the first valve position, respectively. Oil pressure generated in the master cylinder 3 by operation of the brake pedal 1 is transmitted to the wheel cylinder 5 of the front left (FL) wheel through the main line 20 and the branch line 21, to the wheel cylinder 6 of the rear right (RR) wheel through the main line 20 and the branch line 22, to the wheel cylinder 4 of the front right (FR) wheel through the main line 30 and the branch line 31, and to the wheel cylinder 7 of the rear left (RL) wheel through the main line 30 and the branch line 32, respectively.

The construction of the system for carrying out an antiskid operation is described below.

The hydraulic pumps 8 and 9 are driven by a hydraulic motor 10, to suck brake oil through branch lines 51 and 61 connected to return lines 50 and 60, respectively, which return lines 50 and 60 communicate with a reservoir 11 mounted on the master cylinder 3, and to supply the brake oil to the wheel cylinders 4, 5, 6, and 7 through sublines 70 and 80.

A branch line 71 of the subline 70 can communicate with a subbranch line 33 of the branch line 31 through a second valve 104. The branch line 71 has an orifice 91 for restricting the flow rate therethrough. The second valve 104 is a three-port-two-position valve; one outlet port being connected to the subbranch line 33, and the other outlet port being connected to a branch line 55 of the return line 50. Thus, the second valve 104 allows the branch line 71 to communicate with the subbranch line 33 at the first valve position (the normal valve position) shown in the drawing, and the subbranch line 33 to communicate with the branch line 55 at the second valve position (the offset valve position) not shown in the drawing. Therefore, when the second valve 104 is positioned at the first valve position, brake oil discharged from the pump 8 is supplied to the wheel cylinder 4 of the front right (FR) wheel through the subline 70, the branch line 71 and the subbranch line 33. Conversely, when the second valve 104 is positioned at the second valve position, brake oil in the wheel cylinder 4 is released to the reservoir 11 through the subbranch line 33, the branch line 51, and the return line 50.

A branch line 72 of the subline 70 can communicate with a subbranch line 34 of the branch line 32 through a second valve 105. An orifice 92 is provided in the branch line 72. The second valve 105 is a three-port-two position valve; one outlet port being connected to the subbranch line 34, and the other outlet port being connected to a branch line 52 of the return line 50. Thus, the second valve 105 allows the branch line 72 to communicate with the subbranch line 34 to lead brake oil discharged from the pump 8 to the wheel cylinder 7 of the rear left (RL) wheel when the second valve 105 is positioned at the first valve position shown in the drawing. Conversely, the second valve 105 allows the subbranch line 34 to communicate with the branch line 52 to release brake oil in the wheel cylinder 7 of the rear left (RL) wheel to the reservoir 11 when the second valve 105 is positioned at the second valve position not shown in the drawing.

A branch line 81 of the subline 80 can communicate with a subbranch line 27 of the branch line 21 through a second valve 106. An orifice 93 is provided in the branch line 81. The second valve 106 is a three-port-two-position valve; one outlet port being connected to the subbranch line 27, and the other outlet port being connected to a branch line 62 of the return line 60. Thus, the second valve 106 allows the branch line 81 to communicate with the subbranch line 27 to lead brake oil discharged from the pump 9 to the wheel cylinder 5 of the front left (FL) wheel when the second valve 106 is positioned at the first valve position shown in the drawing. Conversely, the second valve 106 allows the subbranch line 27 to communicate with the branch line 62 to release brake oil in the wheel cylinder 5 of the front left (FL) wheel to the reservoir 11 when the second valve 106 is positioned at the second valve position not shown in the drawing.

The same construction as described above is provided in a branch line 82 of the subline 80. That is, the branch line 82 is provided with an orifice 94, and is connected to a subbranch line 28 and a branch line 63 through a second valve 107. The second valve 107 leads brake oil to the wheel cylinder 6 of the rear right (RR) wheel when positioned at the first valve position, and releases brake oil in the wheel cylinder 6 of the rear right (RR) wheel of the reservoir 11 when positioned at the second valve position. The second valves 104, 105, 106, and 107 are solenoid controlled valves.

The oil hydraulic pumps 8 and 9 discharge the same quantity of pressurized oil, and are coaxially rotated by the oil hydraulic motor 10 connected to the pumps 8 and 9 through a coaxial shaft and universal coupling. The oil hydraulic pump 8 has an inlet port and an outlet port to accommodate the flow of pressurized oil therethrough. The inlet and outlet ports are bypassed by a relief pipe 73 provided with a relief valve 109 and a third valve 111. Pressure in the main line 30 is conducted through a lead line 14 to the relief valve 109 to open the relief pipe 73 in response to the pressure in the main line 30 so that the pressure of the oil discharged from the oil hydraulic pump 8 is kept at a pressure not higher than the pressure in the main line 30 when the third valve 111 is open. Similarly, the oil hydraulic pump 9 has inlet and outlet ports which are bypassed by a relief pipe 83 having a relief valve 110 and a third valve 112. The relief valve 110 is subjected to a pressure in the main line 20 through a lead line 15, to open the relief pipe 83 in response to the pressure in the main line 20 so that the pressure of the oil discharged from the pump 9 is kept at a pressure not higher than the pressure in the main line 20 when the third valve 112 is open. The third valves 111 and 112 are two-port-two-position valves, and open the relief pipes 73 and 83 when positioned at the first valve position shown in the drawing, and close the relief pipe 83 and 83 when positioned at the second valve position, not shown in the drawing.

A pressure switch 41 is provided between the upstream portion of the main line 20 and the branch line 21 to sense the pressure difference between the portions upstream and downstream of the first valve 101. The pressure switch 41 senses a pressure PM from the master cylinder 3 in the upstream portion of the main line 20, and a pressure PW from the wheel cylinder 5 in the branch line 21 and the pressure switch 41 is closed when the pressure PW is higher than the pressure PM by a predetermined value, thus sending a closed signal to an Electronic Control Unit (ECU) 130. Upon receipt of the closed signal, the ECU 130 opens the first valve 101 almost immediately.

A pressure switch 43 is provided between the upstream portion of the main line 30 and the branch line 31 to sense the pressure difference between the portions upstream and downstream of the first valve 102. The pressure switch 43 senses a pressure PM from the master cylinder 3 in the upstream portion of the main line 30, and a pressure PW from the wheel cylinder 4 in the branch line 31, and the pressure switch 43 is closed when the pressure PW is higher than the pressure PM by a predetermined value, thus sending a closed signal to the ECU 130. Upon receipt of the closed signal, the ECU 130 opens the first valve 102 almost immediately.

An antiskid control is carried out when any one of the wheels is judged to be locked, in other words, when deceleration or the slip ratio of the wheel is judged to be excessive. The deceleration and slip ratio of the wheel is calculated by the ECU 130 provided with a microcomputer. For this purpose, velocity sensors 121, 122, 123, and 124 are mounted near to each wheel. The ECU 130 switches the control valves 101 and 102 from the first valve position to the second valve position, and turns on a motor relay 131 to start the motor 10, when the ECU 130 decides to initiate an antiskid control. The ECU 130 then switches the second valves 104, 105, 106, and 107 according to the amount of deceleration and slip ratio of a wheel. Note that the second valves 107 and 105 for the rear wheels are switched to the same valve position. For an acceleration slip control, described later, an accelerator switch 132 operated by an accelerator pedal is connected to the ECU 130.

An antiskid control routine will now be described with reference to FIG. 2.

In a non-operative condition, i.e., in which a brake operation is not carried out, the first valves 101 and 102 are positioned at the first valve position, respectively. Therefore, if force is exerted on the brake pedal 1, pressurized oil discharged from the master cylinder 3 is fed to the wheel cylinders 4, 5, 6, and 7 through the branch lines 31, 21, 22, and 32, respectively, so that pressure in these wheel cylinders is immediately increased. In the drawing, if force is exerted on the brake pedal 1 at the time $T_0$, the pressure P in the wheel cylinder quickly rises so that the velocity $V_w$ of the wheel immediately drops. The velocity $V_y$ of the vehicle body begins to drop from the time $T_1$, but the velocity $V_w$ drops faster than the velocity $V_y$.

Figure 2:
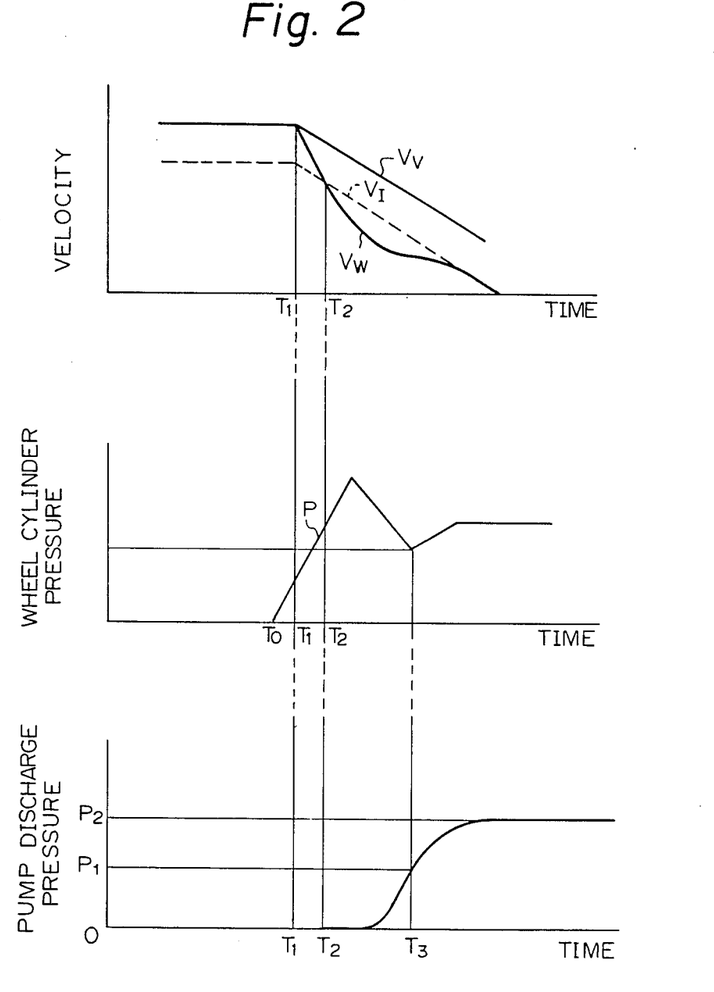
FIG. 2 is a diagram showing variations of a vehicle velocity, a wheel cylinder pressure, and a pump discharge pressure.

Then, if the velocity $V_w$ of the wheel becomes lower than a standard velocity $V_f$, which is lower than the velocity $V_y$ by a predetermined value as shown in FIG. 2, the ECU 130 judges that the slip ratio of the wheel is increasing, and outputs an antiskid control command signal. By this antiskid control command signal, the first valves 101 and 102 are switched to the second valve position, and the motor relay 131 is energized to start the motor 10, so that the wheel cylinders 4, 5, 6, and 7 are supplied with brake oil discharged from the pumps 8 and 9. The discharge pressure of the pumps 8 and 9 begins to rise gradually from time $T_2$, becomes $P_1$ at the time $T_3$, and then reaches $P_2$.

As soon as the first valves 101 and 102 are switched to the second valve position, to reduce the pressure in the wheel cylinder of the locking wheel, the second valve among the second valves 104, 105, 106, and 107 corresponding to the wheel cylinder of the locking wheel is switched to the second valve position. As a result, brake oil in the wheel cylinder is released to the reservoir 11 through the return line 50 or 60. Although the pressure in the wheel cylinder is increased for a little while from time $T_2$, the pressure soon begins to decrease. Then, if deceleration of the wheel is reduced so that the pressure in the wheel cylinder must be again increased, the corresponding second valve is switched to the first valve position at the time $T_3$. As a result, brake oil is gradually supplied to the wheel cylinder through the corresponding branch line 71, 72, 81, and 82, which line has a large flow resistance, so that the pressure in the wheel cylinder is increased at a relatively slow rate.

Subsequently, pressure supplied to the wheel cylinders 4, 5, 6, and 7 is calculated by the ECU 130 according to the deceleration or slip ratio of the wheels, so that a DUTY ratio of an ON-OFF signal sent to the second valves 104, 105, 106, and 107 is properly selected, and thus brake oil at the desired pressure is supplied to the wheel cylinders 4, 5, 6, and 7. As a result, the wheel velocity $V_w$ is controlled and maintained at a value near to the standard velocity $V_f$. Note that an antiskid control is stopped by turning OFF the brake switch connected to the brake pedal 1, and at the same time, switching the first valves 101 and 102 to the first valve position.

In the antiskid control described above, when the driver releases the brake pedal 1 to reduce the braking force the pressure at the master cylinder 3 is reduced, and thus the pressure in the wheel cylinders 4, 5, 6, and 7 must be reduced to correspond with the pressure at the master cylinder 3. In this case, the pressure switches 41 and 42 sense that the pressure in the master cylinder 3 has become lower than the pressure in the wheel cylinders 4, 5, 6, and 7 by a predetermined value, and thus the motor 10 is stopped and the first valves 101 and 102 are opened to communicate the master cylinder 3 with the wheel cylinders 4, 5, 6, and 7. As a result, the pressure in the wheel cylinders 4, 5, 6, and 7 is decreased to a value corresponding to the pressure at the master cylinder 3, which corresponds to the force exerted on the brake pedal 1.

Further, in the antiskid control, if the discharge pressure of the pumps 8 and 9 becomes abnormally high due to a failure of, for example, the relief valves 109 and 110, so that the pressure in the wheel cylinders 4, 5, 6, and 7 becomes higher than a predetermined value, the pressure switches 41 and 42 sense this abnormal condition, and connect the wheel cylinders 4, 5, 6, and 7 to the master cylinder 3, and at the same time, stop the motor 10. Therefore, the piping systems are prevented from ruptures due to an abnormally high pressure.

An acceleration control (prevention of slip of drive wheels when a vehicle is suddenly started from a stop position, for example) is described below.

The wheel velocity sensors 121, 122, 123, and 124 sense the velocity of the drive wheel and the driven wheels simultaneously. If the velocity of the drive wheels is larger than the velocity of the driven wheels by a predetermined value, the ECU 130 judges that the drive wheels are slipping, and switches the first valves 101 and 102 to the second valve position to shut the main lines 20 and 30, and switches the second valves 105 and 107 corresponding to the coupled driving wheels to the second valve position to connect the subbranch lines 28 and 34 to the branch lines 52 and 63. Then, the motor 10 is rotated so that the pumps 8 and 9 are driven, and at the same time, the third valves 111 and 112 are switched to the second valve position to close the relief pipes 73 and 83. Accordingly, pressurized oil discharged from the pumps 8 and 9 is not released to the relief pipes 73 and 83, so that the pumps 8 and 9 can supply pressurized oil having a pressure higher than that of the pressurized oil discharged from the master cylinder 3, to the sublines 70 and 80. The second valves 104 and 106 are switched to the first and second valve positions according to the slip condition of the front right and front left wheels, which are the drive wheels, so that pressurized oil from the pumps 8 and 9 is supplied to the wheel cylinders 4 and 5 of the front right and left wheels to prevent slipping thereof. Note that, in the above embodiment, the drive wheels are the front wheels, but if the drive wheels are the rear wheels, the second valves 105 and 107 are switched to the first and second valve position to prevent the slip of the rear wheels. Further, if there is a difference in the slip condition between the right and left drive wheels, the right and left drive wheels are controlled independently of each other.

Figure 3A:
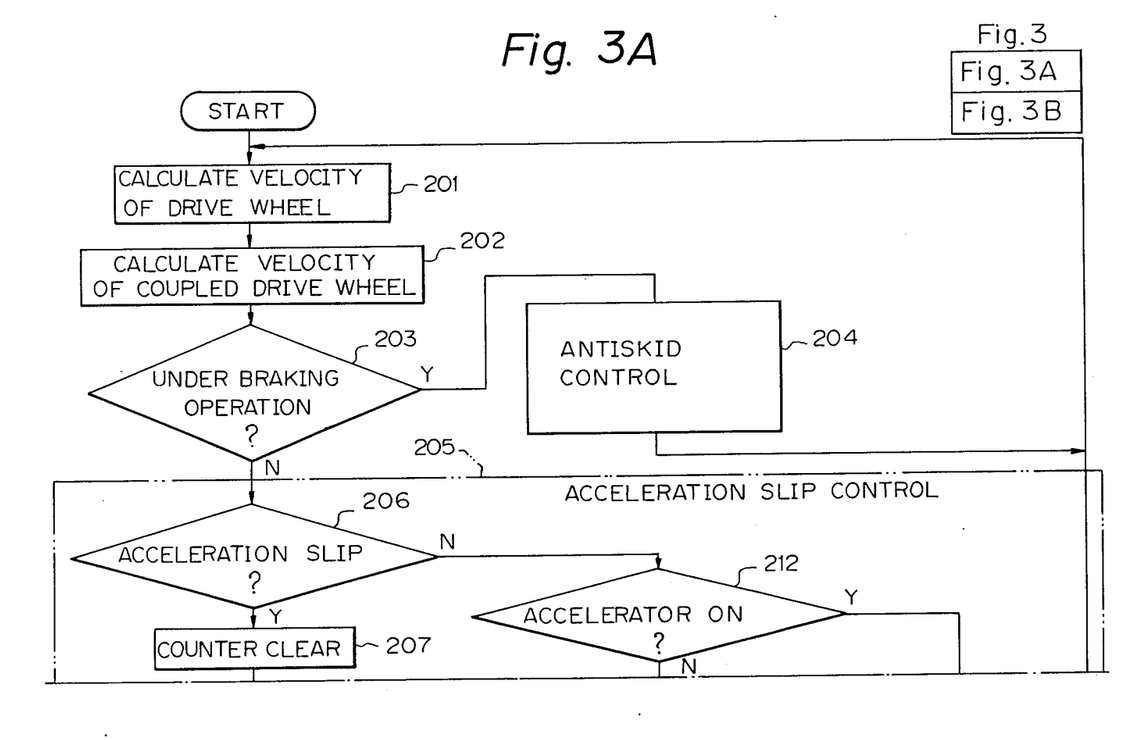
Figure 3B:
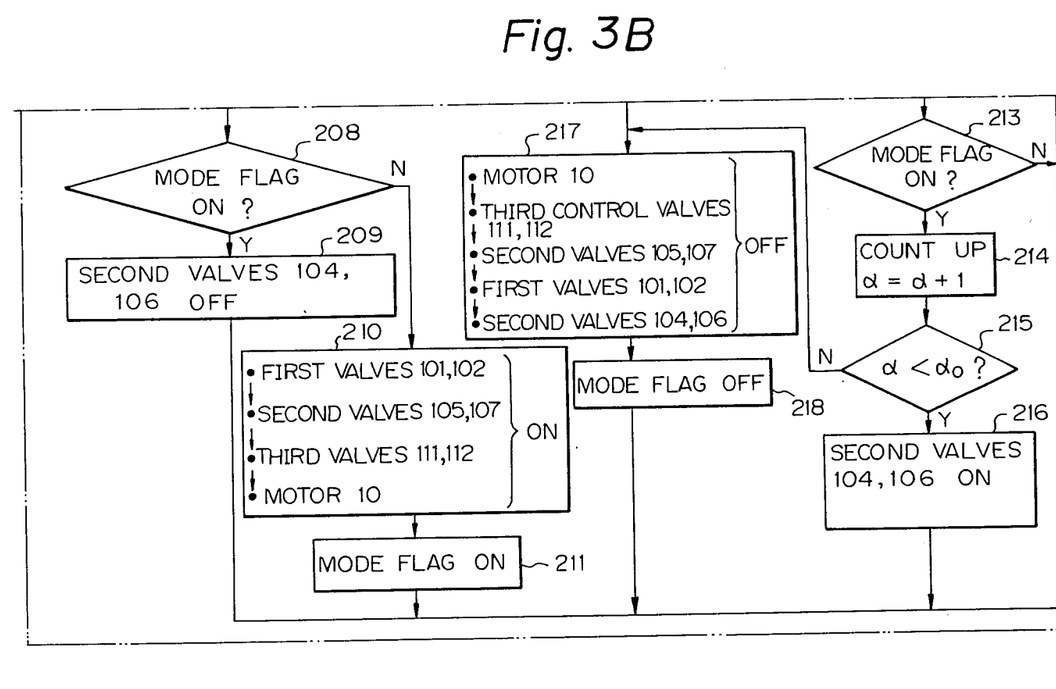

This acceleration slip control routine is described below with reference to the flowchart shown in FIG. 3.

Velocity signals from the wheel velocity sensors 121, 122, 123, and 124 are input to the ECU 130, and the drive wheel velocity $V_x$ is calculated in Step 201, and then the driven wheel velocity $V_y$ is calculated in Step 202. In Step 203, it is judged whether or not a force is exerted on the brake pedal 1, that is, it is judged whether or not a braking operation is being carried out. If a braking operation is in effect, the control proceeds to the routine of Step 204 so that an antiskid control is carried out. If a braking operation is not in effect, the control proceeds to the routine of Step 205 so that an acceleration slip control is carried out.

In the routine of Step 205, the control proceeds to Step 206 and it is judged whether or not an acceleration slip has occurred by comparing the drive wheel velocity $V_x$ with the driven wheel velocity $V_y$. If the drive wheel velocity $V_x$ is larger than the driven wheel velocity $V_y$ by a predetermined value, the ECU 130 judges that an acceleration slip has occurred, so that the control proceeds to Step 207 to clear a counter $\alpha$, and in Step 208, it is judged whether or not a mode flag is turned ON. If the mode flag is turned OFF, the control proceeds to Step 210 so that the first valves 101 and 102, the second valves 105 and 107, the third valves 111 and 112, and the motor 10 are turned ON, in that order. As a result, the first valves 101 and 102 are switched to the second valve position to close the main lines 20 and 30, so that pressure generated from the master cylinder 3 is not exerted on the wheel cylinders, and the second valves 105 and 107 are switched to the second valve position to connect the wheel cylinders 6 and 7 of the driven wheels to the reservoir 11 so that pressure in the wheel cylinders 6 and 7 is released and a braking force is not exerted. The third valves 111 and 112 are then switched to the second valve position to close the relief pipe 73 and 83 so that the discharge pressure of the pumps 8 and 9 is raised. Subsequently, in Step 211, the mode flag is turned ON, and the control is returned to Step 201. Thus, by the above process, the discharge pressure of the pumps 8 and 9 is exerted only on the wheel cylinders 4 and 5 of the drive wheels.

Then, if the Steps 201, 202, 203, 206, and 207 are carried out as in the above process, the routine goes to Step 208, where since the mode flag has been turned ON, the control proceeds to Step 209 to turn OFF the second valves 104 and 106. That is, the second valves 104 and 106 are switched to the first valve position shown in the drawing so that a braking force exerted on the drive wheels to counter an acceleration slip thereat is maintained. If the acceleration slip still occurs, Steps 201, 202, 203, 206, 207, 208, and 209 are repeated, so that a further restraint on the acceleration slip of the drive wheels is carried out.

If the acceleration slip is restrained by the above control, the judgement at Step 206 becomes NO, and the control proceeds to Step 212 where it is determined whether or not a force is exerted on the acceleration pedal by judging a signal from the acceleration switch 132. If a force is exerted on the acceleration pedal, the control proceeds to Step 213 and it is judged whether or not the mode flag is turned ON. As the mode flag is turned ON, the control proceeds to Step 214. In Step 214, the counter $\alpha$ is increased by 1 ($\alpha = \alpha + 1$), and the control proceeds to Step 215 to judge whether or not the predetermined time $\alpha_0$ has lapsed. If the predetermined time has not lapsed, the control proceeds to Step 216, and the second valves 104 and 106 are turned ON, i.e., switched to the second valve position, so that the braking oil pressure in the wheel cylinders 4 and 5 of the drive wheels is decreased. Then the control returns to Step 201.

During restraint of the acceleration slip, Steps, 201, 202, 203, 206, 212, 213, 214, 215, and 216 are carried out so that the brake pressure in the wheel cylinders of the drive wheels is decreased.

By this operation, if the acceleration slip of the drive wheels occurs again, the judgement of the acceleration slip changes from NO to YES in Step 206. Therefore, in Step 207, the counter is turned OFF, i.e., is cleared to zero, and the control proceeds to Step 209 through Step 208. In Step 209, the second valves 104 and 106 are turned OFF, i.e., switched to the first valve position, so that the wheel cylinders exert a braking force on the drive wheels to resume the restraint of the acceleration slip.

As described above, repeatedly increasing and decreasing the braking force exerted by the wheel cylinders on the drive wheels is carried out, to prevent the acceleration slip, and the vehicle can be stably and effectively started or accelerated.

On the other hand, if a predetermined time has lapsed since the acceleration slip is countered, in Step 215, the judgement of $\alpha < \alpha_0$ is changed from YES to NO, and the control proceeds to Step 217. In Step 217, the motor 10, the third valves 111 and 112, the second valves 105 and 107, the first valves 101 and 102, and the second valves 104 and 106 are turned OFF, in that order. And then in Step 218, the mode flag is turned OFF, so that the brake system is returned to a usual condition.

Although the front wheels are the drive wheels in the above embodiment, the present invention can be applied to a vehicle in which the rear wheels are the drive wheels. In this case, braking force exerted by the wheel cylinders on the rear wheels is controlled so that an acceleration slip is restrained.

The count value $\alpha_0$ by which it is judged whether or not an acceleration slip control is finished may be constant, or can be varied according to a condition of the vehicle.

Figure 4:
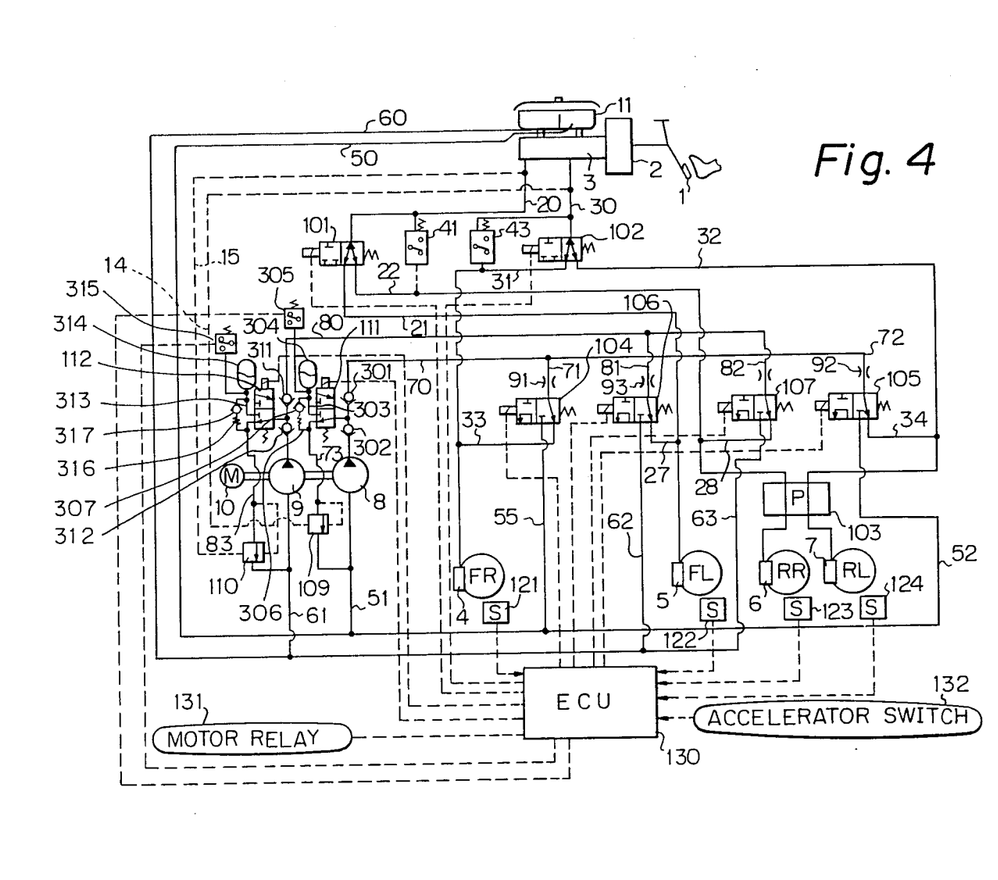
FIG. 4 is a hydraulic circuit of a second embodiment of the present invention.

FIG. 4 shows a second embodiment of the present invention.

Parts of the construction of the second embodiment are the same as in the first embodiment, and therefore, an explanation thereof is omitted and only different parts are described below.

First and second check valves 301 and 302 are provided in the subline 70 connected to the discharge port of the pump 8 to allow oil to flow only from the pump 8 to the second valves 104 and 105, that is, to prevent a back flow in the subline 70. Between the first and second check valves 301 and 302, one end of the relief pipe 73 is connected to the subline 70. The third valve 111 is a three-port-two-position valve, and selectively connects the upstream portion of the relief pipe 73 to the downstream portion thereof at the first valve position, or to an accumulator pipe 303 provided with an accumulator 304, at the second valve position. The accumulator 304 holds highly pressurized brake oil therein, and is supplied with pressurized oil discharged from the pump 8 when the third valve 111 is at the second valve position, not shown in the drawing. An accumulator pressure switch 305 is connected to the accumulator pipe 303 to sense the pressure in the accumulator 304. The accumulator pressure switch 305 sends a pressure signal to the ECU 130, so that the ECU 130 controls the pump 8 to maintain the pressure in the accumulator 304 within a predetermined value. That is, if the accumulated pressure in the accumulator 304 drops below a predetermined value, the accumulator pressure switch 305 senses the lowered pressure, and the ECU 130 switches the second valves 104 and 105 and the third valve 111 to the second valve position and rotates the motor 10 to drive the pump 8. Pressurized oil discharged from the pump 8 is then accumulated in the accumulator 304 through the third valve 111. Then, when the pressure in the accumulator 304 reaches a predetermined value, the motor 10 is stopped by the ECU 130.

A subrelief pipe 306 connects the accumulator pipe 303 and a downstream portion of the third valve 111 of the relief pipe 73, and is provided with a check valve 307. The check valve 307 opens when the pressure in the accumulator 304 is higher than a predetermined value, to allow a flow of oil only from the accumulator 304 to the relief pipe 73.

First and second check valves 311 and 312 are provided in the subline 80 connected to the discharge port of the pump 9 to prevent a back flow in the subline 80. One end of the relief pipe 83 is connected to the subline 80 between the first and second check valves 311 and 312. The third valve 112 is a three-port-two-position valve, and selectively connects the upstream portion of the relief pipe 83 to the downstream portion thereof at the first valve position, or to an accumulator pipe 313 provided with an accumulator 314, at the second valve position. The accumulator 314 is supplied with pressurized oil discharged from the pump 9 when the third valve 112 is at the second valve position, not shown in the drawing. An accumulator pressure switch 315 is connected to the accumulator 313 to sense the pressure in the accumulator 314. The accumulator pressure switch 315 operates in the same way as the accumulator pressure switch 305. A subrelief pipe 316 having a check valve 317 connects the accumulator pipe 313 to the relief pipe 83.

When an antiskid control is carried out, the third valves 111 and 112 are kept in the first valve position.

When an acceleration slip control is effected, after the main lines 20 and 30 are closed by the first valves 101 and 102, the second valves 105 and 107 corresponding to the driven wheels are switched to the second valve position to connect the subbranch lines 28 and 34 to the branch lines 52 and 63. The motor 10 is then rotated to drive the pumps 8 and 9, and the third valves 111 and 112 are switched to the second valve position to close the relief pipes 73 and 83. As a result, pressurized oil accumulated in the accumulators 304 and 314 is sent to the sublines 70 and 80, and at the same time, the pumps 8 and 9 supply pressurized oil, having a pressure higher than that of the pressurized oil discharged from the master cylinder 3, to the sublines 70 and 80. Then, the second valves 104 and 106 are switched to the first and second valve positions according to the slip condition of the front right and left wheels, which are the drive wheels, so that pressurized oil from the pumps 8 and 9 is supplied to the wheel cylinders 4 and 5 of the right and left wheels to present slip thereof.

Figure 5:
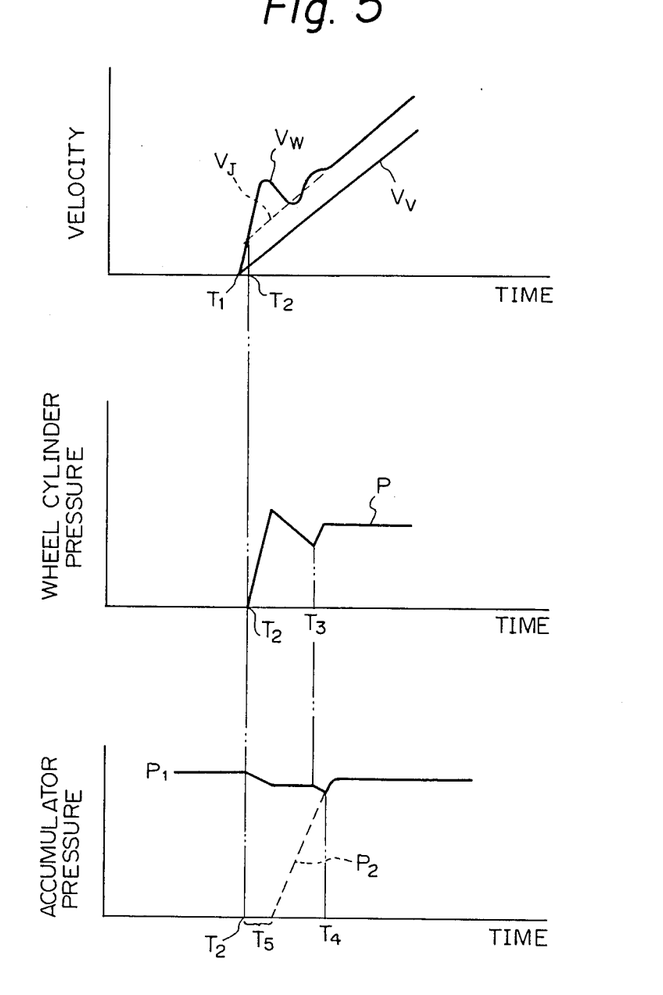
FIG. 5 is a diagram showing variations of a vehicle velocity, a wheel cylinder pressure, and an accumulator pressure.

The acceleration slip control carried out by the second embodiment is explained with reference to FIG. 5.

If the accelerator pedal is suddenly depressed to the full extent of its travel, the velocity $V_w$ of the drive wheels is suddenly increased due to slip. The velocity $V_v$ of the vehicle begins to increase from the time $T_1$, and the rate of increase of the velocity $V_w$ becomes higher than the velocity $V_v$ of the vehicle. Thus, if the velocity $V_w$ of the wheels becomes higher than the standard velocity $V_J$, as shown in FIG. 5, the ECU 130 judges that slip ratio is excessive and outputs a command signal for slip control. As a result, the first valves 101 and 102 are switched to the second valve position so that the wheel cylinders 4, 5, 6, and 7 are cut off from the master cylinder 3, and the second valves 105 and 107 are switched to the second valve position so that oil in the wheel cylinders 6 and 7 is released to the reservoir 11. Further, the third valves 111 and 112 are switched to the second valve position, and the motor 10 is driven, so that the pressure in the accumulators 304 and 314 and the discharge pressure from the pumps 8 and 9 are exerted only on the wheel cylinders 4 and 5 of the drive wheels. The pressure in the accumulators 304 and 314 gradually decreases from the time $T_2$, and becomes the same value as the pump discharge pressure $P_2$, which starts to increase at the time after the time $T_2$ by the time $T_5$.

If the ratio of increase of the velocity of the wheel is reduced and the acceleration slip thereof is restrained, the necessity for a decrease in the wheel cylinder pressure occurs, and thus the second valves 104 and 106 corresponding to the drive wheels are switched to the second valve position, so that pressurized brake oil in the wheel cylinders is released to the reservoir 11 through the return lines 50 and 60. Although the pressure in the wheel cylinders is increased for a little while from the time $T_2$, the pressure soon begins to drop. Thus, the rate of decrease of the wheel velocity is reduced. Then, if acceleration slip occurs again, so that the necessity for an increase in the wheel cylinder pressure occurs, the second valves 104 and 106 are switched to the first valve position at, for example, the time $T_3$.

Subsequently, the pressure exerted on the wheel cylinders 4 and 5 is calculated, according to the acceleration or slip ratio of the wheel, by the ECU 103, and the ratio of the ON signal and OFF signal sent to the each second valve 104 and 106 is selected so that brake oil having the proper pressure is supplied to each wheel cylinder 4 and 5. As a result, the velocity $V_w$ is controlled to a value near the standard value $V_J$. Note that the slip control is finished when the brake switch is turned ON or the acceleration switch is turned OFF, or when a predetermined time has lapsed after slip has disappeared. At this time, the motor 10, the third valves 111 and 112, the second valves 104 and 106, the first valves 101 and 102, and the second valves 105 and 107 are turned OFF.

In the above two embodiments, the second valves 104 and 106 corresponding to the drive wheels are simply controlled to turn ON or OFF. But, the second valves 104 and 106 may be controlled to turn ON and OFF by a duty ratio control.

Further, in both embodiments, the third valves 111 and 112 are maintained in the ON status from the time when acceleration slip is judged to the time when the acceleration slip control is finished. The third valves 111 and 112, however, may be controlled in such a manner that the third valves 111 and 112 are turned ON (the second valves 104 and 106 are turned OFF) when acceleration slip occurs, and the third valves 111 and 112 are turned OFF (the second valves 104 and 106 are turned ON) when acceleration slip does not occur.

In the above two embodiments, acceleration slip is judged by comparing the difference between the velocity of the drive wheel and the velocity of the driven wheels. The acceleration slip, however, may be judged by comparing an acceleration of the drive wheel and a set value, or comparing a velocity of the drive wheel and a vehicle velocity relative to ground or an acceleration of the vehicle.

Although the second valves 104 and 106 corresponding to the drive wheels are controlled to turn ON and OFF at the same time in the above two embodiments, the second valves 104 and 106 may be controlled independently to each other in another embodiment, so that maneuverability of a vehicle on a road where the friction coefficients between the right and left wheels are different, is improved. In this case, when acceleration slip occurs in only one of the wheels on a surface having a low friction coefficient, only the second valve corresponding to the slipping wheel may be controlled, or the second valve and the third valve corresponding to the slipping wheel may be controlled.

Although embodiments of the present invention have been described herein with reference to the attached drawings, many modifications and changes may be made by those skilled in this art without departing from the scope of the invention.

What is claimed is:

1. A brake oil pressure control device of a brake system for reducing a speed of wheels of a vehicle, said brake system including a brake pedal, a master cylinder connected to said brake pedal, a reservoir holding brake oil, and wheel cylinders, said device comprising;
   a main line system having a main line connecting said master cylinder to said wheel cylinders, and a first valve provided between said master cylinder and said wheel cylinders to open and close said main line,
   a subline system having a pressure source, a subline connecting said pressure source to said wheel cylinders, and a second valve provided between said pressure source and said wheel cylinders to open and close said subline,
   a means for controlling an oil pressure at said pressure source, said controlling means having a relief pipe connecting a discharge port of said pressure source to said reservoir, a relief valve provided in said relief pipe, said relief valve opening said relief pipe in accordance with an oil pressure at said master cylinder so that the oil pressure at said pressure source is restricted to be not higher than the oil pressure at said master cylinder, and a third valve provided in said relief pipe to open and close said relief pipe,
   a means for sensing a locking and slipping condition of said wheels, and
   a valve control mechanism controlling said first, second and third valves in accordance with a locking and slipping condition of said wheels.

2. A brake oil pressure control device according to claim 1, wherein said first valve opens said main line when a normal braking operation is carried out, and closes said main line when at least one of said wheels is locked or slipping.

3. A brake oil pressure control device according to claim 1, wherein said third valve opens said relief pipe so that said pressure source discharges pressurized oil having a pressure not higher than the pressure at said master cylinder, when at least one of said wheels is locked during a braking operation.

4. A brake oil pressure control device according to claim 1, wherein said third valve closes said relief pipe so that said pressure source discharges pressurized oil, when at least one of said wheels is slipping on acceleration of said vehicle.

5. A brake oil pressure control device according to claim 1, wherein said second valve opens and closes said subline to control oil pressure at said wheel cylinders.

6. A brake oil pressure control device according to claim 1, further comprising a pressure switch sensing a pressure difference between an upstream portion and a downstream portion of said main line, said pressure switch closing said first valve when a pressure at said downstream portion is higher than a pressure at said upstream portion by a predetermined value.

7. A brake oil pressure control device according to claim 1, further comprising an accumulator connected to said relief pipe, and accumulating pressurized oil generated by said pressure source.

8. A brake oil pressure control device according to claim 7, wherein said accumulator is connected to a discharge port of said pressure source through said third valve when said third valve closes said relief pipe.

9. A brake oil pressure control device according to claim 7, further comprising an accumulator switch connected to said accumulator, said accumulator switch sensing a pressure at said accumulator to control said pressure source so that said pressure at said accumulator is kept within a predetermined value.

* * * * *